Nov. 3, 1925.

A. C. HOPKINS

GEAR REDUCTION

Filed Nov. 8, 1923

Inventor:
Arthur C. Hopkins,
By Dyrenforth, Lee, Chritton & Wiles
Attys

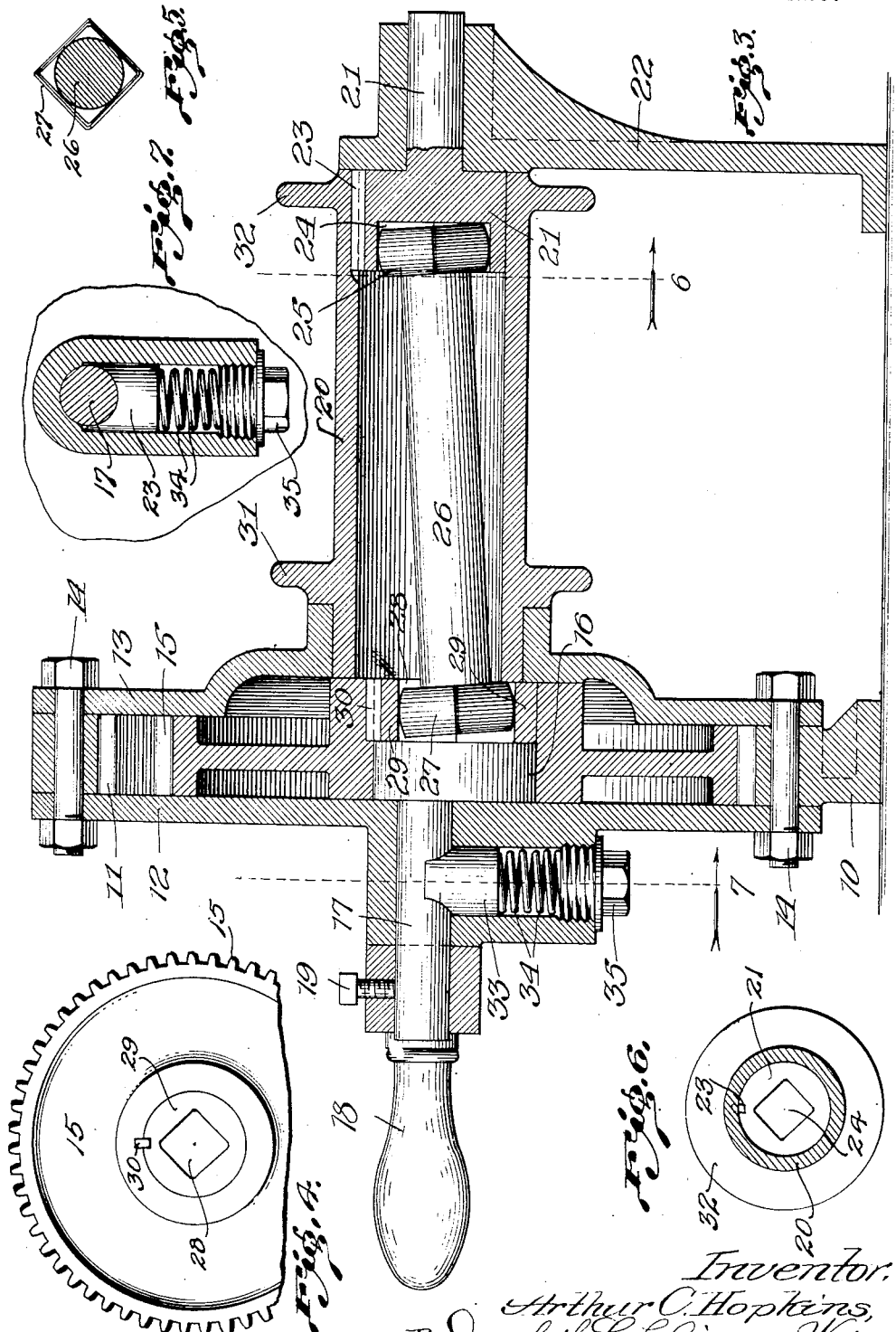

Patented Nov. 3, 1925.

1,560,161

UNITED STATES PATENT OFFICE.

ARTHUR C. HOPKINS, OF NILES, MICHIGAN.

GEAR REDUCTION.

Application filed November 8, 1923. Serial No. 673,495.

*To all whom it may concern:*

Be it known that I, ARTHUR C. HOPKINS, a citizen of the United States, residing at Niles, in the county of Berrien and State of Michigan, have invented a new and useful Improvement in Gear Reduction, of which the following is a specification.

This invention relates to gear reduction and is particularly adapted to be used for hoists, jacks and the like and is fully described in the following specification and shown in the accompanying drawings in which:

Fig. 3 is a longitudinal section on the line 3 of Fig. 2;

Fig. 4 is a front elevation of the movable gear;

Fig. 5 is a sectional view of the oscillating driving shaft taken on the line 6 of Fig. 3;

Fig. 6 is a view on the same line showing the oscillating driving shaft removed; and Fig. 7 is a section on the line 7 of Fig. 3.

Figure 1:
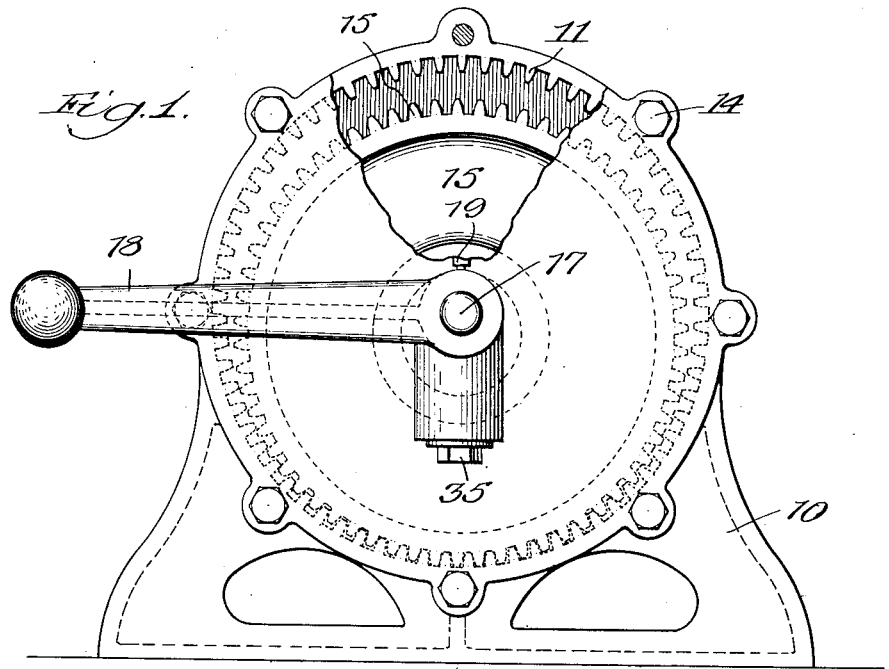
Figure 1 is a front elevation of the device.
Figure 2:
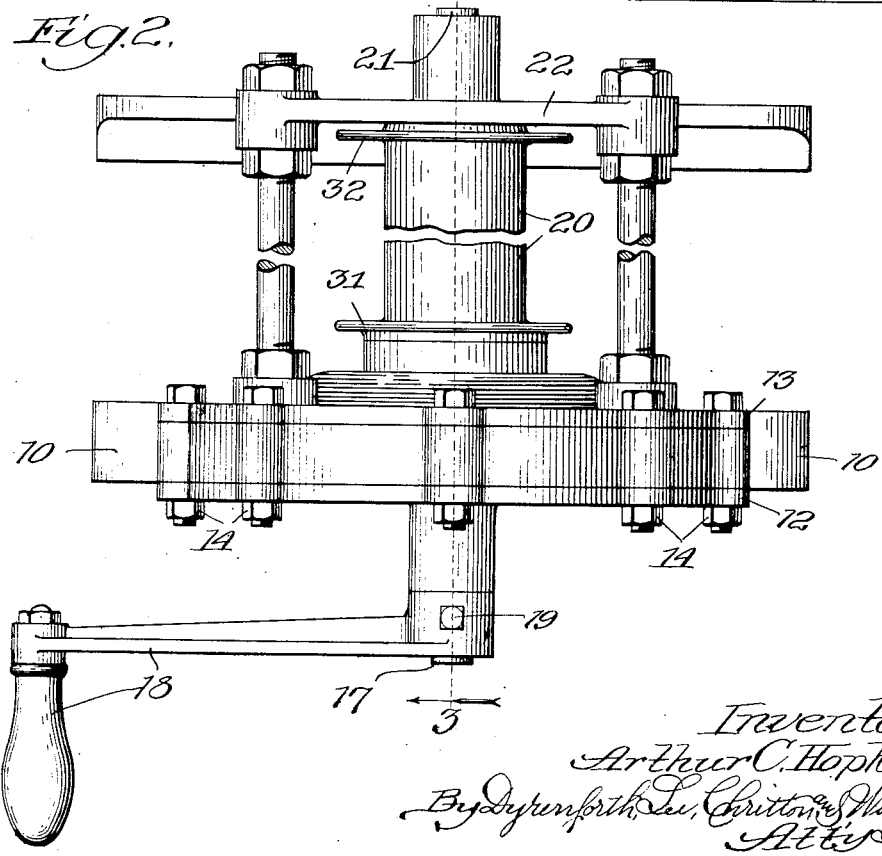
Fig. 2 is a top plan view of the same.

The device as illustrated comprises an end frame 10 having an internal gear 11 formed therein with plates 12 and 13 secured thereto by means of bolts 14.

A movable gear 15 is journaled upon an eccentric 16 mounted upon the shaft 17, the latter being journaled in the plate 12 coaxially with the stationary internal gear 11. The shaft 17 is driven by means of a crank 18 which is secured thereto by means of a screw 19. The gear 15 meshes with the internal gear 11 so that as the shaft 17 is rotated the gear 15 revolves upon the eccentric 16 due to the difference between the number of the teeth composing the two gears.

A hollow shaft or drum member 20 is journaled at one end in a suitable bearing in the plate 13 and at the other has an extension 21 which is journaled in a suitable bearing in the bracket 22. The stub shaft 21 is illustrated as secured in the hollow shaft 20 by means of a key 23.

A squared recess 24 is formed within the enlarged portion of the stub shaft 21 as shown in Figs. 3 and 6 which is adapted to receive one of the squared ends 25 of the oscillating driving shaft 26, the opposite squared end 27 of which is similarly mounted in a squared opening 28 in the collar 29 which is secured within the center of the gear 15 by means of a key 30.

From the foregoing it will be understood that as the shaft 17 is rotated, the movable gear 15 is carried around within the housing meshing as it rolls with the internal gear 11 thereby slowly driving the gear 15 upon the eccentric 16 as an axis. This rotational motion of the gear 15 is transmitted to the oscillating driving shaft 26 which in turn drives the stub shaft 21 and this through the key 23 drives the hollow shaft 20.

In the device illustrated the shaft 20 serves as a drum from which a flexible wire rope or the like may be wound and for this purpose flanges are provided. The stub shaft 21 and the hollow shaft 20 may be geared or otherwise operably connected to any piece of mechanism which it is desired to drive.

In order to overcome any tendency of the shaft 21 to drive backward through the mechanism to move the driving shaft 17, I have provided a brake shoe 33 which is pressed against the latter shaft by means of a spring 34 which is held in place by the plug 35.

While I have shown and described certain embodiments of my invention, it is to be understood that it is capable of many modifications. Changes therefore in the construction and arrangement may be made without departing from the spirit and scope of the invention as disclosed in the appended claims, in which it is my intention to claim all novelty inherent in my invention as broadly as possible in view of the prior art.

I claim:

1. In a gear reduction, a driving shaft, a driven shaft, a stationary housing having an internal gear fixed thereto, a movable gear meshing with said fixed gear and eccentric thereto, guides at the sides of said movable gear, a cam on said driving shaft journaled concentrically in said movable gear, and a flexible driving means connecting said movable gear and driven shaft.

2. In a gear reduction, a driving shaft, a driven shaft, a stationary housing having an internal gear fixed thereto, guides at the sides of said movable gear, said shafts being journaled therein, a movable gear meshing with said fixed gear and eccentric thereto, a cam on said driving shaft journaled concentrically in said movable gear, and a flexible driving means connecting said movable gear and driven shaft.

3. In a gear reduction, a driving shaft, a driven shaft, a stationary housing having an internal gear fixed thereto, a movable gear meshing with said fixed gear and eccentric thereto, guides at the sides of said movable gear contacting with substantially its entire periphery, a cam on said driving shaft journaled concentrically in said movable gear, and a flexible driving means connecting said movable gear and driven shaft.

4. In a gear reduction, a driving shaft, a driven shaft, a stationary housing having a gear fixed thereto, a movable gear meshing with said fixed gear and eccentric thereto, guides at the sides of said movable gear contacting with substantially its entire periphery, a cam on said driving shaft journaled concentrically in said movable gear, a flexible driving means connecting said movable gear and driven shaft, and a brake on the driving shaft to prevent the driving shaft being driven by the driven shaft.

5. In a gear reduction, a driving shaft, a driven shaft, a stationary housing having a gear fixed thereto, a movable gear meshing with said fixed gear and eccentric thereto, lateral guides in said housing for the movable gears, a cam on said driving shaft journaled concentrically in said movable gear, the driving shaft terminating in said cam, and a universal joint connecting said movable gear and driven shaft.

ARTHUR C. HOPKINS.